United States Patent
Berg

(10) Patent No.: US 7,960,047 B2
(45) Date of Patent: Jun. 14, 2011

(54) METHOD AND APPARATUS FOR MONITORING AND CONTROLLING AN ELECTROCHEMICAL CELL

(75) Inventor: Carl Berg, Cupertino, CA (US)

(73) Assignee: Valence Technology, Inc., Las Vegas, NV (US)

( * ) Notice: Subject to any disclaimer, the term of this patent is extended or adjusted under 35 U.S.C. 154(b) by 752 days.

(21) Appl. No.: 11/873,924

(22) Filed: Oct. 17, 2007

(65) Prior Publication Data

US 2008/0090134 A1 Apr. 17, 2008

Related U.S. Application Data

(60) Provisional application No. 60/829,728, filed on Oct. 17, 2006.

(51) Int. Cl.
*H01M 10/42* (2006.01)
*H01M 10/50* (2006.01)
*H02J 7/00* (2006.01)

(52) U.S. Cl. .............................. 429/61; 429/62; 320/134

(58) Field of Classification Search .................... 429/61, 429/62; 320/128, 134
See application file for complete search history.

(56) References Cited

U.S. PATENT DOCUMENTS

| | | | |
|---|---|---|---|
| 5,596,567 A * | 1/1997 | deMuro et al. ................ | 320/106 |
| 6,074,775 A | 6/2000 | Gartstein et al. | |
| 6,118,248 A | 9/2000 | Gartstein et al. | |
| 6,163,131 A | 12/2000 | Gartstein et al. | |
| 6,483,275 B1 | 11/2002 | Nebrigic et al. | |
| 6,835,491 B2 | 12/2004 | Gartstein et al. | |
| 7,059,769 B1 | 6/2006 | Potega | |
| 2006/0152190 A1 | 7/2006 | Riemschneider | |
| 2007/0103121 A1 * | 5/2007 | Johnson et al. ................ | 320/134 |

OTHER PUBLICATIONS

International Search Report PCT/US2007/081619 dated May 15, 2008.

* cited by examiner

*Primary Examiner* — Stephen J. Kalafut
(74) *Attorney, Agent, or Firm* — Brian T. Mangum; Cynthia S. Kovacevic; Roger A. Williams

(57) ABSTRACT

An apparatus for monitoring and controlling at least one electrochemical cell is disclosed and described, having a cell management device in electrical communication with the electrochemical cell. The cell management device monitors the electrochemical cell and controls electrical input into and output from the electrochemical cell based on a predetermined set of conditions.

18 Claims, 5 Drawing Sheets

METHOD AND APPARATUS FOR MONITORING AND CONTROLLING AN ELECTROCHEMICAL CELL

This application claims the benefit of Provisional application Ser. No. 60/829,728 filed Oct. 17, 2006.

FIELD OF THE INVENTION

This invention relates to a novel method and apparatus for controlling and monitoring an electrochemical cell, and more particularly an electrochemical cell containing an electronic apparatus adapted to control and monitor the operation of the electrochemical cell.

BACKGROUND OF THE INVENTION

A secondary or rechargeable battery consists of one or more electrochemical cells, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Such batteries generally include an electrochemically active material having a crystal lattice structure or framework from which ions can be extracted and subsequently reinserted, and/or permit ions to be inserted or intercalated and subsequently extracted.

Typically, multiple electrochemical cells are connected in series or parallel fashion and positioned within a housing to form a battery pack. Larger battery packs (e.g. pack capacity>100 A·hr) may contain hundreds of electrochemical cells, the failure of any one of which may render the entire pack non-functional and irreparable. Accordingly, there is a need for a method and apparatus capable of identifying and isolating a failing or failed electrochemical cell (or string of cells) from the remaining cells, in order to maintain the operability of the remaining cells and, therefore, the pack.

SUMMARY OF THE INVENTION

One embodiment of the present invention provides a novel method and apparatus for monitoring and controlling at least one electrochemical cell. The electrochemical cell includes an electrode assembly enclosed in a casing. The electrode assembly includes a separator interposed between a first electrode (positive electrode) and a counter second electrode (negative electrode), for electrically insulating the first electrode from the second electrode. An electrolyte (preferably a non-aqueous solvent-based electrolyte) is provided for transferring ionic charge carriers between the first electrode and the second electrode during charge and discharge of the electrochemical cell.

The first or positive electrode includes an electrode active material represented by the general formula:

wherein:
(i) A is selected from the group consisting of elements from Group I of the Periodic Table, and mixtures thereof, and $0 \leq a \leq 9$;
(ii) M includes at least one redox active element, and $0 < b \leq 4$;
(iii) L is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
  (a) X' and X''' are each independently selected from the group consisting of P, As, Sb, Si, Ge, V, S, and mixtures thereof;
  (b) X'' is selected from the group consisting of P, As, Sb, Si, Ge, V, and mixtures thereof;
  (c) Y' is selected from the group consisting of halogens selected from Group 17 of the Periodic Table, S, N, and mixtures thereof;
  (d) $0 \leq x \leq 3$, $0 \leq y \leq 2$, $0 \leq z \leq 1$ and $0 < z \leq 3$;
(iv) Z is selected from the group consisting of a hydroxyl (OH), a halogen selected from Group 17 of the Periodic Table, and mixtures thereof, and $0 \leq e \leq 4$; and
wherein A, M, L, Z, a, b, c and d are selected so as to maintain electroneutrality of the positive electrode active material in its nascent or "as-synthesized" state.

A cell management device interposed between an external load and the first and/or second electrode monitors various aspects of the electrochemical cell, and controls the electrical input into/output from the electrochemical cell based on a predetermined set of conditions.

Another embodiment of the present invention provides a novel method and apparatus for monitoring and controlling two or more electrochemical cells arranged in parallel and/or series electrical communication with each other. At least one of the electrochemical cells includes a cell management device as described above. A remotely located programmable pack management device in wireless communication with the cell management device(s) receives and records monitoring data transmitted by each cell management device, and is further adapted to transmit control instructions to each cell management device.

DETAILED DESCRIPTION OF THE PREFERRED EMBODIMENTS

It has been found that the novel cell management device, when used alone or together with a pack management device, afford benefits over such materials among those known in the art. Such benefits include, without limitation, the avoidance and/or reduction of pack failures, the continued pack operation after the failure of one or more cells has occurred, and the ability to tailor the operational range of a pack. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

One embodiment of the present invention provides a novel method and apparatus for monitoring and controlling at least one electrochemical cell, wherein the cell includes:

(a) a first electrode (also commonly referred to as a positive electrode or cathode) which includes an active material of the present invention;

(b) a second electrode (also commonly referred to as a negative electrode or anode) which is a counter-electrode to the first electrode; and (c) an electrolyte in ion-transfer communication with the first and second electrodes.

The architecture of a battery is selected from the group consisting of cylindrical wound designs, z-fold designs, wound prismatic and flat-plate prismatic designs, and polymer laminate designs.

Figure 1:
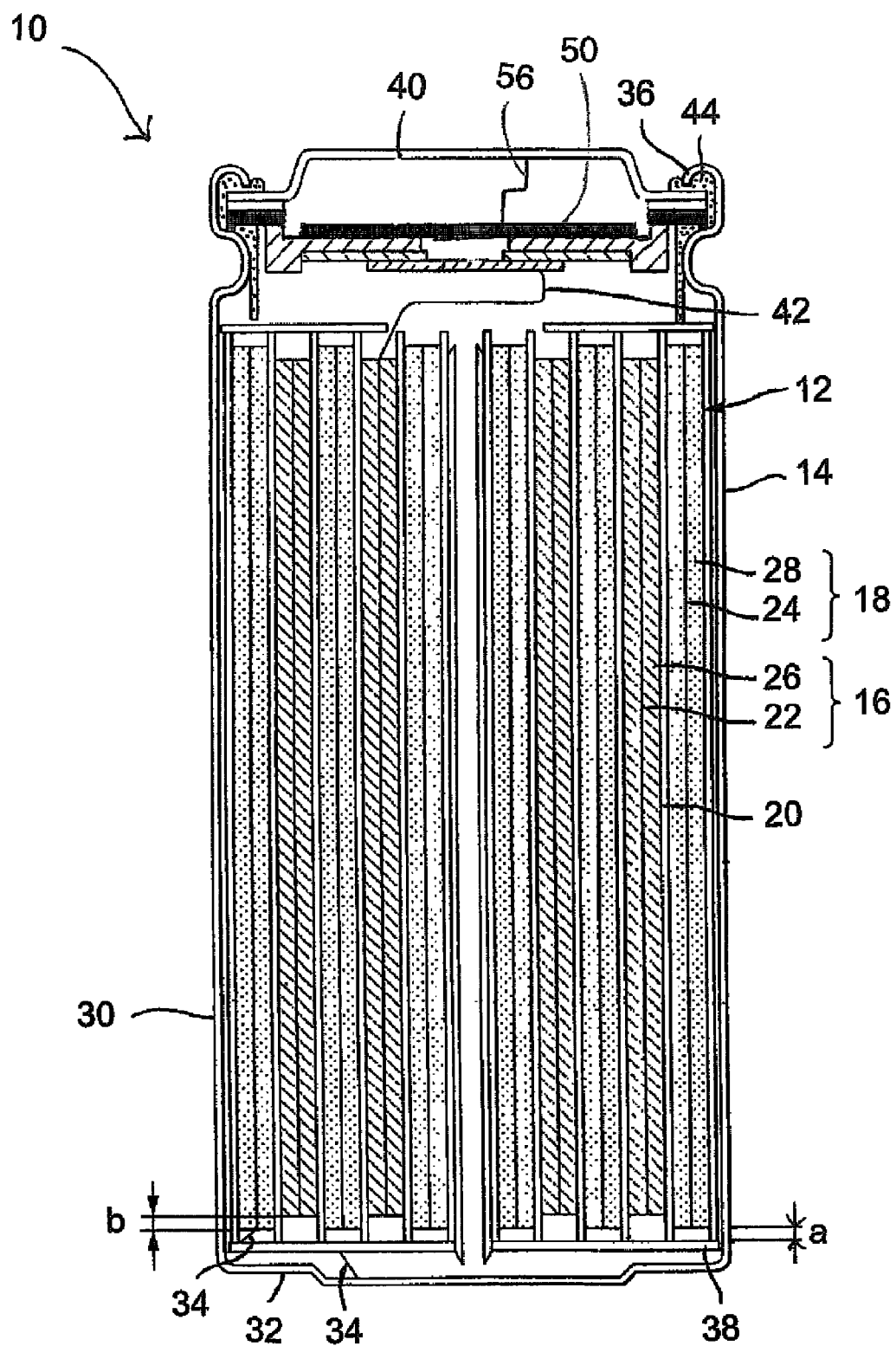
FIG. 1 is a schematic cross-sectional diagram illustrating the structure of an embodiment of an electrochemical cell of the present invention.

Referring to FIG. 1, in one embodiment the electrochemical cell 10 includes a spirally coiled or wound electrode assembly 12 enclosed in a sealed container, preferably a rigid cylindrical casing 14 as illustrated in FIG. 1. In one subembodiment, the cell 10 is a prismatic-type cell, and the casing has a substantially rectangular cross-section (not illustrated).

Referring again to FIG. 1, the electrode assembly 12 includes: a positive electrode 16 consisting of, among other things, an electrode active material represented by general formulas (1) through (8) described herein below; a counter negative electrode 18; and a separator 20 interposed between the first and second electrodes 16,18. The separator 20 is preferably an electrically insulating, ionically conductive microporous film, and composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16,18 includes a current collector 22 and 24, respectively, for providing electrical communication between the electrodes 16,18 and an external load. Each current collector 22,24 is a foil or grid of an electrically conductive metal such as iron, copper, aluminum, titanium, nickel, stainless steel, or the like, having a thickness of between 5 µm and 100 µm, preferably 5 µm and 20 µm. Optionally, the current collector may be treated with an oxide-removing agent such as a mild acid and the like, and coated with an electrically conductive coating for inhibiting the formation of electrically insulating oxides on the surface of the current collector 22,24. Examples of a suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-cohexafluoropropylene); polyesters including poly(adipic acid-coethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 10 µm and 150 µm, preferably between 25 µm and 125 µm, in order to realize the optimal capacity for the cell 10. The positive electrode film 26 is composed of between 80% and 95% by weight of an electrode active material represented by general formulas (1) through (8) (described herein below), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer, ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. In one subembodiment, the negative electrode is an alkali metal foil, such as a lithium metal foil. In another subembodiment, the negative electrode film 28 is composed of between 80% and 95% of an intercalation material, between 2% and 10% by weight binder, and (optionally) between 1% and 10% by of an weight electrically conductive agent.

Intercalation materials suitable herein include: transition metal oxides, metal chalcogenides, carbons or carbonaceous materials (e.g. graphite), and mixtures thereof. In one embodiment, the intercalation material is selected from the group consisting of crystalline graphite and amorphous graphite, and mixtures thereof, each such graphite having one or more of the following properties: a lattice interplane (002) d-value ($d_{(002)}$) obtained by X-ray diffraction of between 3.35 Å to 3.34 Å, inclusive (3.35 Å$\leq d_{(002)} \leq$3.34 Å), preferably 3.354 Å to 3.370 Å, inclusive (3.354 Å$\leq d_{(002)} \leq$3.370 Å; a crystallite size ($L_c$) in the c-axis direction obtained by X-ray diffraction of at least 200 Å, inclusive ($L_c \geq$200 Å), preferably between 200 Å and 1,000 Å, inclusive (200 Å$\leq L_c \leq$1,000 Å); an average particle diameter ($P_d$) of between 1 µm to 30 µm, inclusive (1 µm$\leq P_d \leq$30 µm); a specific surface (SA) area of between 0.5 m$^2$/g to 50 m$^2$/g, inclusive (0.5 m$^2$/g$\leq$SA$\leq$50 m$^2$/g); and a true density (p) of between 1.9 g/cm$^3$ to 2.25 g/cm$^3$, inclusive (1.9 g/cm$^3 \leq$p$\leq$2.25 g/cm$^3$).

Referring again to FIG. 1, to ensure that the electrodes 16,18 do not come into electrical contact with one another, in the event the electrodes 16,18 become offset during the winding operation during manufacture, the separator 20 "overhangs" or extends a width "a" beyond each edge of the negative electrode 18. In one embodiment, 50 µm$\leq$a$\leq$2,000 µm. To ensure alkali metal does not plate on the edges of the negative electrode 18 during charging, the negative electrode 18 "overhangs" or extends a width "b" beyond each edge of the positive electrode 16. In one embodiment, 50 µm$\leq$b$\leq$2,000 µm.

The cylindrical casing 14 includes a cylindrical body member 30 having a closed end 32 in electrical communication with the negative electrode 18 via a negative electrode lead 34, and an open end defined by crimped edge 36. In operation, the cylindrical body member 30, and more particularly the closed end 32, is electrically conductive and provides electrical communication between the negative electrode 18 and an external load (not illustrated). An insulating member 38 is interposed between the spirally coiled or wound electrode assembly 12 and the closed end 32.

A positive terminal cap 40 in electrical communication with the positive electrode 16 via a positive electrode lead 42 provides electrical communication between the positive electrode 16 and the external load (not illustrated). A gasket member 44 sealingly engages the upper portion of the cylindrical body member 30 to the positive terminal cap 40.

A non-aqueous electrolyte (not shown) provides ionic communication between the positive electrode 16 and the negative electrode 18, by transferring ionic charge carriers between the positive electrode 16 and the negative electrode 18 during charge and discharge of the electrochemical cell 10. The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a $\gamma$-lactone such as $\gamma$-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phosphoric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts include: $LiClO_4$; $LiBF_4$; $LiPF_6$; $LiAlCl_4$; $LiSbF_6$; $LiSCN$; $LiCl$; $LiCF_3SO_3$; $LiCF_3CO_2$; $Li(CF_3SO_2)_2$; $LiAsF_6$; $LiN(CF_3SO_2)_2$; $LiB_{10}Cl_{10}$, lithium bis(oxalate)borate; a lithium lower aliphatic carboxylate; $LiCl$; $LiBr$; $LiI$; a chloroboran of lithium; lithium tetraphenylborate; lithium imides; sodium and potassium analogues of the aforementioned lithium salts; and mixtures thereof. Preferably, the electrolyte contains at least $LiPF_6$.

Referring again to FIG. 1, as noted herein above the positive electrode film 26 contains a positive electrode active material. The electrode active material is represented by the general formula (1):

$$A_a M_b L_c Z_d. \tag{1}$$

Composition variables A, M, L and Z, as defined herein, as well as their corresponding stoichiometric values, are selected so as to maintain electroneutrality of the electrode active material in its nascent or as-synthesized state, and specifically to satisfy the equation $$a + V^M(b) = V^L(c) + d,$$

wherein $V^M$ is the oxidation state for composition variable M, and $V^L$ is the oxidation state for composition variable L. The stoichiometric values of one or more elements of the composition may take on non-integer values.

For all embodiments described herein, composition variable A is selected from the group consisting of elements from Group I of the Periodic Table, and mixtures thereof (e.g. $A_a = A_{a-a'}A'_{a'}$, wherein A and A' are each selected from the group consisting of elements from Group I of the Periodic Table and are different from one another, and a'<a). As referred to herein, "Group" refers to the Group numbers (i.e., columns) of the Periodic Table as defined in the current IUPAC Periodic Table. (See, e.g., U.S. Pat. No. 6,136,472 to Barker et al., incorporated by reference herein.) In addition, the recitation of a genus of elements, materials or other components, from which an individual component or mixture of components can be selected, is intended to include all possible sub-generic combinations of the listed components, and mixtures thereof. Also, "include," and its variants, is intended to be non-limiting, such that recitation of items in a list is not to the exclusion of other like items that may also be useful in the materials, compositions, devices, and methods of this invention.

In one subembodiment, A is selected from the group consisting of Li (Lithium), Na (Sodium), K (Potassium), and mixtures thereof. In another subembodiment, A selected from the group consisting of Na, and a mixture of Na with K, and a mixture of Na with Li. In one subembodiment, A is Li.

A sufficient quantity (a) of composition variable A should be present so as to allow all of the "redox active" elements of composition variable M (as defined herein below) to undergo oxidation/reduction during cycling. In one embodiment, $0 \leq a \leq 6$. In another embodiment, $0 \leq a \leq 4$. In another embodiment, $1 \leq a \leq 2$. Unless otherwise specified, a variable described herein algebraically as equal to ("="), less than or equal to ("$\leq$"), or greater than or equal to ("$\geq$") a number is intended to subsume values or ranges of values about equal or functionally equivalent to the number.

Removal of an amount (a) of composition variable A from the electrode active material is accompanied by a change in oxidation state of at least one of the "redox active" elements in the active material, as defined herein below. The amount of redox active material available for oxidation/reduction in the active material determines the amount (a) of composition variable A that may be removed. Such concepts are, in general application, known in the art, e.g., as disclosed in U.S. Pat. No. 4,477,541 to Fraioli and U.S. Pat. No. 6,136,472 to Barker, et al., both of which are incorporated by reference herein.

In general, the amount (a) of composition variable A in the active material varies during charge/discharge. Where the active materials of the present invention are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (a″) of composition variable A is removed from the active material as described above. The resulting structure, containing less amount of composition variable A (i.e., a-a″) than in the nascent or as-prepared state, and at least one of the redox active components having a higher oxidation state than in the as-prepared state, while essentially maintaining the original stoichiometric values of the remaining components (e.g. A, M, L and Z). The active materials of this invention include such materials in their nascent state (i.e., as manufactured prior to inclusion in an electrode) and materials formed during operation of the battery (i.e., by insertion or removal of A).

Referring again to general formula (1), in all embodiments described herein, composition variable M includes at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Redox active elements useful herein with respect to composition variable M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. For each embodiment described herein, M may comprise a mixture of oxidation states for a particular element (e.g., $M=Mn^{2+}Mn^{4+}$).

In one embodiment, composition variable M is a redox active element. In one subembodiment, M is a redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, composition variable M includes one or more redox active elements and one or more non-redox active elements. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium); Group 15 elements, particularly As (Arsenic), Sb (Antimony), and Bi (Bismuth); Group 16 elements, particularly Te (Tellurium); and mixtures thereof.

In one embodiment, $M=MI_n MII_o$, wherein $0<o+n \leq c$ and each of o and n is greater than zero ($o,n>0$), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts. "Isocharge substitution" refers to a substitution of one element on a given crystallographic site with an element having the same oxidation state (e.g. substitution of $Fe^{2+}$ with $Mg^{2+}$). "Aliovalent substitution" refers to a substitution of one element on a given crystallographic site with an element having a different oxidation state (e.g. substitution of $Fe^{2+}$ with $Li^+$).

For all embodiments described herein where MI is partially substituted by MII by isocharge substitution, MI may be substituted by an equal stoichiometric amount of MII, whereby $M=MI_{n-o}MII_o$. Where MI is partially substituted by MII by isocharge substitution and the stoichiometric amount of MI is not equal to the amount of MII, whereby $M=MI_{n-q}MII_o$, $o \neq q$ and $0<q<o$, then the stoichiometric amount of one or more of the other components (e.g. A, L and Z) in the active material must be adjusted in order to maintain electroneutrality.

For all embodiments described herein where MI is partially substituted by MII by aliovalent substitution and an equal amount of MI is substituted by an equal amount of MII, whereby $M=MI_{n-o}MII_o$, then the stoichiometric amount of one or more of the other components (e.g. A, L and Z) in the active material must be adjusted in order to maintain electroneutrality. However, MI may be partially substituted by MII by aliovalent substitution by substituting an "oxidatively" equivalent amount of MII for MI, whereby $$M = MI_{n-\frac{o}{V^{MI}}} MII_{\frac{o}{V^{MII}}},$$

wherein $V^{MI}$ is the oxidation state of MI, and $V^{MII}$ is the oxidation state of MII.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^{2+}$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals from Group I of the Periodic Table, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, M1 is a 3+ oxidation state redox active element selected from the group specified immediately above, and MII is selected from the group consisting of alkali metals from Group I of the Periodic Table, $Cu^{1+}$, $Ag^{1+}$ and mixtures thereof.

In another embodiment, $M=M1_qM2_rM3_s$, wherein:
(v) M1 is a redox active element with a 2+ oxidation state;
(vi) M2 is selected from the group consisting of redox and non-redox active elements with a 1+ oxidation state;
(vii) M3 is selected from the group consisting of redox and non-redox active elements with a 3+ or greater oxidation state; and
(viii) at least one of q, r and s is greater than 0, $0<q+r+s\leq c$, and at least one of M1, M2, and M3 is redox active.

In one subembodiment, q, r and s>0. In another subembodiment, M1 is substituted by an equal amount of M2 and/or M3, whereby q=q-(r+s). In this subembodiment, then the stoichiometric amount of one or more of the other components (e.g. A, L and Z) in the active material may be adjusted in order to maintain electroneutrality.

In another subembodiment, M1 is substituted by an "oxidatively" equivalent amount of M2 and/or M3, whereby $$M = M1_{q-\frac{r}{VM1}-\frac{s}{VM1}} M2_{\frac{r}{VM2}} M3_{\frac{s}{VM3}},$$

wherein $V^{M1}$ is the oxidation state of M1, $V^{M2}$ is the oxidation state of M2, and $V^{M3}$ is the oxidation state of M3, wherein at least one of q, r and s is greater than 0. In one subembodiment, q, r and s are each greater than 0 (q,r,s>0).

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$ and mixtures thereof; M2 is selected from the group consisting of $Cu^{1+}$, $Ag^{1+}$, and mixtures thereof; and M3 is selected from the group consisting of $Sc^{3+}$, $Y^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In all embodiments described herein, composition variable L is a polyanion selected from the group consisting of $X'[O_{4-x}, Y'_x]$, $X'[O_{4-y},Y'_{2y}]$, $X''S_4$, $[X_z''',X'_{1-z}]O_4$, and mixtures thereof, wherein:

(a) X' and X''' are each independently selected from the group consisting of P, As, Sb, Si, Ge, V, S, and mixtures thereof;
(b) X'' is selected from the group consisting of P, As, Sb, Si, Ge, V, and mixtures thereof;
(c) Y' is selected from the group consisting of halogens selected from Group 17 of the Periodic Table, S, N, and mixtures thereof; and
(d) $0\leq x\leq 3$, $0\leq y\leq 2$, and $0\leq z\leq 1$.

In one subembodiment, L is selected from the group consisting of $PO_4$, $SiO_4$, $GeO_4$, $VO_4$, $AsO_4$, $SbO_4$, $SO_4$, and mixtures thereof. In one particular subembodiment, composition variable L contains $PO_4$ with another polyanion selected from the group consisting of $SiO_4$, $GeO_4$, $VO_4$, $AsO_4$, $SbO_4$ and $SO_4$. In one subembodiment, composition variable L includes about 80% or more phosphate ($PO_4$) and up to about 20% of another polyanion selected from the group consisting of $SiO_4$, $GeO_4$, $VO_4$, $AsO_4$, $SbO_4$ and $SO_4$. In another subembodiment, $L=PO_4$.

In another subembodiment, L is selected from the group consisting of $X'[O_{4-x}, Y'_x]$, $X'[O_{4-y},Y'_{2y}]$, and mixtures thereof, $0<x\leq 3$ and $0<y\leq 2$, wherein a portion of the oxygen (O) in the L composition variable is substituted with a halogen, S, N, or a mixture thereof.

In all embodiments described herein, composition variable Z is selected from the group consisting of OH (Hydroxyl), halogens selected from Group 17 of the Periodic Table, and mixtures thereof. In one subembodiment, Z is selected from the group consisting of OH, F (Fluorine), Cl (Chlorine), Br (Bromine), and mixtures thereof. In another subembodiment, Z is OH. In another embodiment, Z is F. In another subembodiment, Z is a mixture of F with one of OH, Cl, and Br. For all embodiments described herein, $0\leq d\leq 1$.

In one particular embodiment of the present invention, the electrode active material is represented by the general formula (2):

$$A_aM_b(PO_4)Z_d, \quad (2)$$

wherein moieties A, M, and Z are as described herein above, $0.1<a\leq 4$, $8\leq b\leq 1.2$ and $0\leq d\leq 4$; and wherein A, M, Z, a, b, and d are selected so as to maintain electroneutrality of the electrode active material in its nascent or as-synthesized state. Specific examples of electrode active materials represented by general formula (2), wherein d>0, include $Li_2Fe_{0.9}Mg_{0.1}PO_4F$, $Li_2Fe_{0.8}Mg_{0.2}PO_4F$, $Li_2Fe_{0.95}Mg_{0.05}PO_4F$, $Li_2CoPO_4F$, $Li_2FePO_4F$, and $Li_2MnPO_4F$.

In a subembodiment, M includes at least one element from Groups 4 to 11 of the Periodic Table, and at least one element from Groups 2, 3, and 12-16 of the Periodic Table. In a particular subembodiment, M includes an element selected from the group consisting of Fe, Co, Mn, Cu, V, Cr, and mixtures thereof; and a metal selected from the group consisting of Mg, Ca, Zn, Ba, Al, and mixtures thereof.

In another embodiment, the electrode active material is represented by the general formula (3):

$$AM'_{1-j}M''_jPO_4, \quad (3)$$

wherein moiety A is as described herein above, and wherein M' is at least one transition metal from Groups 4 to 11 of the Periodic Table and has a +2 valence state; M'' is at least one metallic element which is from Group 2, 12, or 14 of the Periodic Table and has a +2 valence state; and $0<j<1$. In one subembodiment, M' is selected from the group consisting of Fe, Co, Mn, Cu, V, Cr, Ni, and mixtures thereof; more preferably M' is selected from Fe, Co, Ni, Mn and mixtures thereof. Preferably, M" is selected from the group consisting of Mg, Ca, Zn, Ba, and mixtures thereof.

In another embodiment, the electrode active material is represented by the general formula (4):

$$LiFe_{1-q}M''_qPO_4, \quad (4)$$

wherein M" is selected from the group consisting of Mg, Ca, Zn, Sr, Pb, Cd, Sn, Ba, Be, and mixtures thereof; and $0 \leq q \leq 1$. In one subembodiment, $0 < q \leq 0.2$. In a another subembodiment, M is selected from the group consisting of Mg, Ca, Zn, Ba, and mixtures thereof, more preferably, M" is Mg. In another subembodiment the electrode active material is represented by the formula $LiFe_{1-q}Mg_qPO_4$, wherein $0 < q \leq 0.5$. Specific examples of electrode active materials represented by general formula (4) include $LiFe_{0.8}Mg_{0.2}PO_4$, $LiFe_{0.9}Mg_{0.1}PO_4$, and $LiFe_{0.95}Mg_{0.05}PO_4$.

In another embodiment, the electrode active material is represented by the general formula (5):

$$A_aCo_uFe_vM^{13}{}_wM^{14}{}_{aa}M^{15}{}_{bb}L, \quad (5)$$

wherein:
a. moiety A is as described herein above, $0 < a \leq 2$
b. $u > 0$ and $v > 0$;
c. $M^{13}$ is one or more transition metals, wherein $w \geq 0$;
d. $M^{14}$ is one or more +2 oxidation state non-transition metals, wherein $aa \geq 0$;
e. $M^{15}$ is one or more +3 oxidation state non-transition metals, wherein $bb \geq 0$;
f. L is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V and mixtures thereof; Y' is selected from the group consisting of halogen, S, N, and mixtures thereof; $0 \leq x \leq 3$; and $0 \leq y \leq 2$; and wherein $0 < (u+v+w+aa+bb) < 2$, and $M^{13}$, $M^{14}$, $M^{15}$, $XY_4$, a, u, v, w, aa, bb, x, and y are selected so as to maintain electroneutrality of the electrode active material in its nascent or as-synthesized state. In one subembodiment, $0.8 \leq (u+v+w+aa+bb) \geq 1.2$, wherein $u \geq 0.8$ and $0.05 \leq v \leq 0.15$. In another subembodiment, $0.8 \leq (u+v+w+aa+bb) \leq 1.2$, wherein $u \geq 0.5$, $0.01 \leq v \leq 0.5$, and $0.01 \leq w \leq 0.5$.

In one subembodiment, $M^{13}$ is selected from the group consisting of Ti, V, Cr, Mn, Ni, Cu and mixtures thereof. In another subembodiment, $M^{13}$ is selected from the group consisting of Mn, Ti, and mixtures thereof. In another subembodiment, $M^{14}$ is selected from the group consisting of Be, Mg, Ca, Sr, Ba, and mixtures thereof. In one particular subembodiment, $M^{14}$ is Mg and $0.01 \leq bb \leq 0.2$, preferably $0.01 \leq bb \leq 0.1$. In another particular subembodiment, $M^{15}$ is selected from the group consisting of B, Al, Ga, In, and mixtures thereof.

In another embodiment, the electrode active material is represented by the general formula (6):

$$LiM(PO_{4-x}Y'_x), \quad (6)$$

wherein M is $M^{16}{}_{cc}M^{17}{}_{dd}M^{18}{}_{ee}M^{19}{}_{ff}$, and
a. $M^{16}$ is one or more transition metals;
b. $M^{17}$ is one or more +2 oxidation state non-transition metals;
c. $M^{18}$ is one or more +3 oxidation state non-transition metals;
d. $M^{19}$ is one or more +1 oxidation state non-transition metals;
e. Y' is halogen; and
wherein $cc > 0$, each of dd, ee, and $ff \geq 0$, $(cc+dd+ee+ff) \leq 1$, and $0 \leq x \leq 0.2$. In one subembodiment, $cc \geq 0.8$. In another subembodiment, $0.01 \leq (dd+ee) \leq 0.5$, preferably $0.01 \leq dd \leq 0.2$ and $0.01 \leq ee \leq 0.2$. In another subembodiment $x=0$.

In one particular subembodiment, $M^{16}$ is a +2 oxidation state transition metal selected from the group consisting of V, Cr, Mn, Fe, Co, Cu, and mixtures thereof. In another subembodiment, $M^{16}$ is selected from the group consisting of Fe, Co, and mixtures thereof. In a preferred subembodiment $M^{17}$ is selected from the group consisting of Be, Mg, Ca, Sr, Ba and mixtures thereof. In a preferred subembodiment $M^{18}$ is Al. In one subembodiment, $M^{19}$ is selected from the group consisting of Li, Na, and K, wherein $0.01 \leq ff \leq 0.2$. In a preferred subembodiment $M^{19}$ is Li. In one preferred subembodiment $x=0$, $(cc+dd+ee+ff)=1$, $M^{17}$ is selected from the group consisting of Be, Mg, Ca, Sr, Ba and mixtures thereof, preferably $0.01 \leq dd \leq 0.1$, $M^{18}$ is Al, preferably $0.01 \leq ee \leq 0.1$, and $M^{19}$ is Li, preferably $0.01 \leq ff \leq 0.1$. In another preferred subembodiment, $0 < x \leq 0$, preferably $0.01 \leq x \leq 0.05$, and $(cc+dd+ee+ff) < 1$, wherein $cc \geq 0.8$, $0.01 \leq dd \leq 0.1$, $0.01 \leq ee \leq 0.1$ and $ff=0$. Preferably $(cc+dd+ee)=1-x$.

In another embodiment, the electrode active material is represented by the general formula (7):

$$A^1{}_a(MO)_bM'_{1-b}XO_4, \quad (7)$$

wherein
(i) $A^1$ is independently selected from the group consisting of Li, Na, K and mixtures thereof, $0.1 < a < 2$;
(ii) M comprises at least one element, having a +4 oxidation state, which is redox active; $0 < b \leq 1$;
(iii) M' is one or more metals selected from metals having a +2 and a +3 oxidation state; and
(iv) X is selected from the group consisting of P, As, Sb, Si, Ge, V, S, and mixtures thereof.

In one subembodiment, $A^1$ is Li. In another subembodiment, M is selected from a group consisting of +4 oxidation state transition metals. In a preferred subembodiment, M is selected from the group comprising Vanadium (V), Tantalum (Ta), Niobium (Nb), molybdenum (Mo), and mixtures thereof. In another preferred subembodiment M comprises V, and $b=1$. M' may generally be any +2 or +3 element, or mixture of elements. In one subembodiment, M' is selected from the group consisting V, Cr, Mn, Fe, Co, Ni, Mo, Ti, Al, Ga, In, Sb, Bi, Sc, and mixtures thereof. In another subembodiment, M' is selected from the group consisting of V, Cr, Mn, Fe, Co, Ni, Ti, Al, and mixtures thereof. In one preferred subembodiment, M' comprises Al. Specific examples of electrode active materials represented by general formula (7) include $LiVOPO_4$, $Li(VO)_{0.75}Mn_{0.25}PO_4$, $Li_{0.75}Na_{0.25}VOPO_4$, and mixtures thereof.

In another embodiment, the electrode active material is represented by the general formula (8):

$$A_aM_bL_3Z_d, \quad (8)$$

wherein moieties A, M, L and Z are as described herein above, $2 \leq a \leq 8$, $1 \leq b \leq 3$, and $0 \leq d \leq 6$; and
wherein M, L, Z, a, b, and d are selected so as to maintain electroneutrality of the electrode active material in its nascent or as-synthesized state.

In one subembodiment, A comprises Li, or mixtures of Li with Na or K. In another preferred embodiment, A comprises Na, K, or mixtures thereof. In another subembodiment, M is selected from the group consisting of Fe, Co, Ni, Mn, Cu, V, Zr, Ti, Cr, and mixtures thereof. In another subembodiment, M comprises two or more transition metals from Groups 4 to 11 of the Periodic Table, preferably transition metals selected from the group consisting of Fe, Co, Ni, Mn, Cu, V, Zr, Ti, Cr, and mixtures thereof. In subembodiment, M comprises $M'_{1-m}M''_m$, where M' is at least one transition metal from Groups 4 to 11 of the Periodic Table; and M" is at least one element from Groups 2, 3, and 12-16 of the Periodic Table; and 0<m<1. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably, M" is selected from the group consisting of Mg, Ca, Zn, Ba, Al, and mixtures thereof. In a preferred embodiment, $XY_4$ is $PO_4$. In another subembodiment, X' comprises As, Sb, Si, Ge, S, and mixtures thereof; X" comprises As, Sb, Si, Ge and mixtures thereof; and 0<x<3. In a preferred embodiment, Z comprises F, or mixtures of F with Cl, Br, OH, or mixtures thereof. In another preferred embodiment, Z comprises OH, or mixtures thereof with Cl or Br. One particular example of an electrode active material represented by general formula (8) is $Li_3V_2(PO_4)_3$.

Non-limiting examples of active materials represented by general formulas (1) through (8) include the following: $Li_2Fe(PO_4)_{0.9}F_{1.3}$; $Li_2Co(PO_4)_{0.9}F_{1.3}$; $Li_2Mn(PO_4)_{0.9}F_{1.3}$; $LiV(PO_4)_{0.9}F_{1.3}$; $LiV(PO_4)_{0.9}F_{1.3}$; $LiV(PO_4)_{0.8}F_{1.6}$; $NaV(PO_4)_{0.8}Cl_{1.6}$; $Li_2Mn_{0.8}Fe_{0.2}(PO_4)_{0.8}F_{1.6}$; $Li_2Mn_{0.9}Fe_{0.8}(PO_4)_{0.9}F_{1.3}$; $Li_2Fe_{0.9}Mg_{0.1}(PO_4)_{0.9}F_{1.3}$; $Li_2Fe_{0.8}Mg_{0.2}(PO_4)_{0.8}F_{1.6}$; $LiFe_{0.95}Mg_{0.05}(PO_4)_{0.6}F_{2.2}$; $Li_{2.025}CO_{0.85}Fe_{0.05}Al_{0.025}Mg_{0.05}(PO_4)_{0.8}F_{1.6}$; $Li_{2.025}Co_{0.80}Fe_{0.10}Al_{0.025}Mg_{0.05}(PO_4)_{0.9}F_{1.3}$; $Li_{2.025}CO_{0.75}Fe_{0.15}Al_{0.025}Mg_{0.05}(PO_4)_{0.7}F_{1.9}$; $Li_{2.025}CO_{0.7}(Fe_{0.4}Mn_{0.6})_{0.2}Al_{0.025}Mg_{0.05}(PO_4)_{0.9}F_{1.3}$; $Li_2Co_{0.8}Fe_{0.1}Ti_{0.025}Mg_{0.05}(PO_4)_{0.9}F_{1.3}$; $Li_{2.025}Cu_{0.8}Fe_{0.1}Ti_{0.025}Al_{0.025}(PO_4)_{0.8}F_{1.6}$; $Li_2CO_{0.825}Fe_{0.1}Ti_{0.025}Mg_{0.025}(PO_4)_{0.9}F_{1.3}$; $LiCo_{0.85}Fe_{0.075}Ti_{0.025}Mg_{0.025}(PO_4)_{0.9}F_{1.3}$. A particularly preferred active material is $LiV(PO_4)_{1-d}F_{1+3d}$, wherein 0<d<0.2.

Methods of making the electrode active materials described by general formulas (1) through (8) are known by those skilled in the art, and such methods are described are described in: WO 01/54212 to Barker et al., published Jul. 26, 2001; International Publication No. WO 98/12761 to Barker et al., published Mar. 26, 1998; WO 00/01024 to Barker et al., published Jan. 6, 2000; WO 00/31812 to Barker et al., published Jun. 2, 2000; WO 00/57505 to Barker et al., published Sep. 28, 2000; WO 02/44084 to Barker et al., published Jun. 6, 2002; WO 03/085757 to Thei et al., published Oct. 16, 2003; WO 03/085771 to Thei et al., published Oct. 16, 2003; WO 03/088383 to Thei et al., published Oct. 23, 2003; U.S. Pat. No. 6,528,033 to Barker et al., issued Mar. 4, 2003; U.S. Pat. No. 6,387,568 to Barker et al., issued May 14, 2002; U.S. Publication No. 2003/0027049 to Barker et al., published Feb. 2, 2003; U.S. Publication No. 2002/0192553 to Barker et al., published Dec. 19, 2002; U.S. Publication No. 2003/0170542 to Barker at al., published Sep. 11, 2003; and U.S. Publication No. 2003/1029492 to Barker et al., published Jul. 10, 2003; the teachings of all of which are incorporated herein by reference.

Active materials of general formulas (1) through (8) are readily synthesized by reacting starting materials in a solid state reaction, with or without simultaneous oxidation or reduction of the metal species involved. Sources of composition variable A include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of composition variable M include salts or compounds of any of the transition metals, alkaline earth metals, or lanthanide metals, as well as of non-transition metals such as aluminum, gallium, indium, thallium, tin, lead, and bismuth. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The elements or elements comprising composition variable M in the starting material may have any oxidation state, depending the oxidation state required in the desired product and the oxidizing or reducing conditions contemplated, as discussed below. The metal sources are chosen so that at least one metal in the final reaction product is capable of being in an oxidation state higher than it is in the reaction product.

Sources for composition variable L are provided by a number of salts or compounds containing positively charged cations in addition to the source of the polyanion or polyanions comprising composition variable L. Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate or other $XO_4$ species, starting materials are preferably provided in particulate or powder form. Hydrates of any of the above may be used, as can mixtures of the above.

Sources of composition variable Z include any of a number of salts or ionic compounds of a halogen or hydroxyl. Non-limiting examples include the alkali-metal halides and hydroxides, and ammonium halides and hydroxides. Hydrates of the above compounds may also be used, as well as mixtures thereof. In particular, the mixtures may contain more than one alkali metal so that a mixed alkali metal active material will be produced in the reaction.

A starting material may provide more than one of composition variables A, M, and L and Z as is evident in the list above. In various embodiments of the invention, starting materials are provided that combine, for example, composition variable M and L, thus requiring only composition variable A and Z be added. In one embodiment, a starting material is provided that contains alkali metal, a metal, and phosphate. Combinations of starting materials providing each of the components may also be used. It is preferred to select starting materials with counterions that give rise to volatile by-products. Thus, it is desirable to choose ammonium salts, carbonates, oxides, and the like where possible. Starting materials with these counterions tend to form volatile by-products such as water, ammonia, and carbon dioxide, which can be readily removed from the reaction mixture. This concept is well illustrated in the Examples below.

The sources of composition variables A, M, L and Z, may be reacted together in the solid state while heating for a time and temperature sufficient to make a reaction product. The starting materials are provided in powder or particulate form. The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms. Exemplary times and temperatures for the reaction are given in the Examples below.

Another means for carrying out the reaction at a lower temperature is hydrothermally. In a hydrothermal reaction, the starting materials are mixed with a small amount of a liquid such as water, and placed in a pressurized bomb. The reaction temperature is limited to that which can be achieved by heating the liquid water in a continued volume creating an increased pressure, and the particular reaction vessel used.

The reaction may be carried out without redox, or if desired under reducing or oxidizing conditions. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in-situ by including in the reaction mixture a reductant that will participate in the reaction to reduce the one or more elements comprising composition variable M, but that will produce by-products that will not interfere with the active material when used later in an electrode or an electrochemical cell. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolize under the reaction conditions to produce a reducing form of carbon. A preferred source of reducing carbon is elemental carbon.

It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

The carbothermal reduction method of synthesis of mixed metal phosphates has been described in PCT Publication WO01/53198, Barker et al., incorporated by reference herein. The carbothermal method may be used to react starting materials in the presence of reducing carbon to form a variety of products. The carbon functions to reduce a metal ion in the starting material M source. The reducing carbon, for example in the form of elemental carbon powder, is mixed with the other starting materials and heated. For best results, the temperature should be about 400° C. or greater, and up to about 950° C. Higher temperatures may be used, but are usually not required.

Referring again to FIG. 1, a cell management device 50 is electrically interposed between an external load (not illustrated) and at least one of the positive and negative electrodes 16 and 18, respectively. The cell management device 50 may be electrically interposed between the positive electrode lead 42 and the positive terminal cap 40 (as illustrated in FIG. 1), between the positive terminal cap 40 and the external load, between the negative electrode lead 34 and the cylindrical body member closed end 32 and/or between the cylindrical body member 30 and the external load.

The cell management device 50 monitors various aspects of the electrochemical cell 10, and controls the electrical input/output from the electrochemical cell based on a predetermined set of conditions. In one embodiment, the cell management device 50 is adapted to monitor one or more of the following aspects of the cell 10: input/output voltage, input/output current, internal cell temperature, external cell temperature, float voltage and current, and internal cell pressure.

Figure 2:
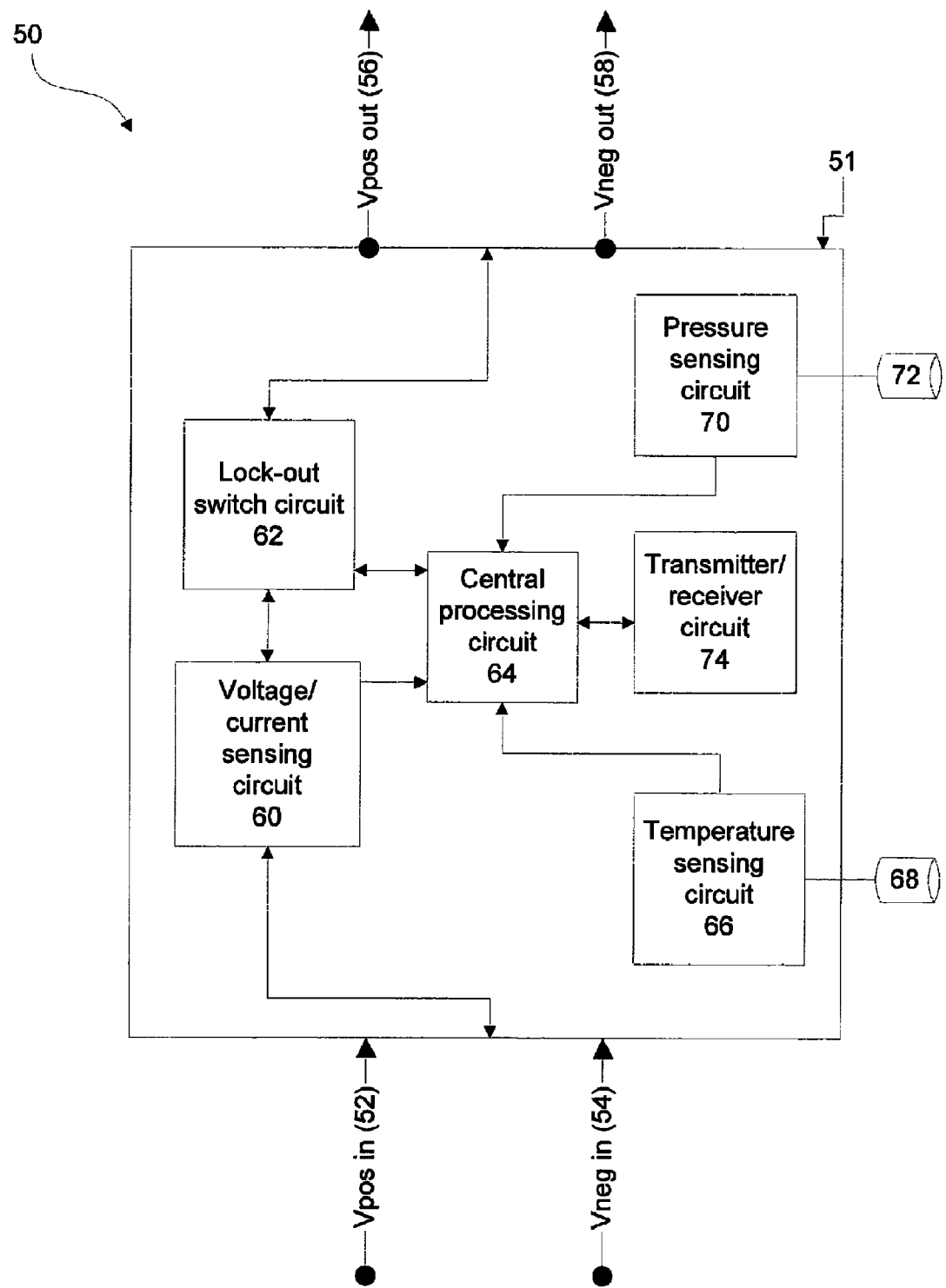
FIG. 2 is a functional diagram of a cell management device.

Referring to FIG. 2, in one embodiment the cell management device 50 is provided on a microchip 51 which includes a positive input lead ($V_{pos}$ in) 52 in electrical communication with the positive electrode 16, a negative input lead ($V_{neg}$ in) 54 in electrical communication with the negative electrode 18, a positive output lead ($V_{pos}$ out) 56 in electrical communication with the positive terminal cap 40, and a negative output lead ($V_{neg}$ out) 58 in electrical communication with the cylindrical body member 30.

A current/voltage sensing circuit 60 is provided for measuring the input and output currents and voltages for the cell 10. A lock-out switch circuit 62 electrically interposed between the input leads 52,54 and the output leads 56,58 is adapted to vary (e.g. reduce) and/or interrupt electrical flow between the leads 52,54,56,58 and, therefore, vary/interrupt electrical communication between the cell 10 and an external load. The various circuits described herein (e.g. current/voltage sensing circuit 60) may exist as individual, stand-alone circuits, or may exist as subcircuits.

Operation of the lock-out switch 62 is controlled by a central processing circuit 64, which is in electrical communication with both the lock-out switch 62 and the current/voltage sensing circuit 60.

A temperature sensor circuit 66 in electrical communication with the central processing circuit 64 is provided for collecting internal and/or external temperature data for the cell 10, generating a data signal based on the data collected and transmitting the same to the central processing circuit 64. The temperature sensor circuit 66 includes one or more temperature sensing elements 68 in electrical communication therewith. The sensing element(s) 68 may be positioned on the microchip 51, positioned proximal to the microchip 51, or may be positioned at a location that is remote from the microchip 51 so as to allow for temperature measurements at multiple locations within and outside the cell 10. The sensing element(s) 68 may be selected from the group consisting of resistance temperature detectors (RTD's), thermistors, thermocouples, diodes, and mixtures thereof. In one subembodiment, the sensing element 68 is a platinum RTD. Sensing elements 68 and supporting circuitry are known in the art and commercially available from companies such as Microchip Technology, Inc. of Chandler, Ariz. In one embodiment, the temperature sensor circuit 66 is capable of measuring temperatures (T) of between −50° C. and 250° C., inclusive (−50° C.≦T≦250° C.). In another embodiment, the temperature sensor circuit 66 is capable of measuring temperatures (T) of between −50° C. and 150° C., inclusive (−50° C.≦T≦150° C.).

A pressure sensor circuit 70 in electrical communication with the central processing circuit 64 is provided for collecting internal pressure data for the cell 10, generating a signal based on the data and transmitting the same to the central processing circuit 64. The pressure sensor circuit 70 includes one or more pressure sensing elements 72 in electrical communication there with. The pressure sensing element(s) 72 may be positioned on the microchip 51, positioned proximal to the microchip 51, or may be positioned at a location that is remote from the microchip 51 so as to allow for pressure measurements at multiple locations within the cell 10. The pressure sensing element(s) 72 may be selected from the group consisting of Parani gauges, thermocouple gauges, convection gauges, and mixtures thereof. Sensing elements 72 and supporting circuitry are known in the art and commercially available from companies such as MKS Instruments of Boulder, Colo.

In one subembodiment, the cell management device 50 further includes a transmitter/receiver circuit 74 in electrical communication with the central processing circuit 64 for wirelessly transmitting to/receiving signals from remotely located electronic devices such as a programmable pack management device (discussed herein below).

In response to signals received by the current/voltage sensing circuit 60, temperature sensor circuit 66, pressure sensor circuit 70 and/or the transmitter/receiver circuit 74 (if provided), the central processing circuit 64 controls the electrical input into/output from the electrochemical cell 10 using the lock-out switch circuit 62.

In embodiments wherein the microchip 51 is positioned within the cell 10, the microchip must be encapsulated with a material which is substantially chemically inert with respect to the electrolyte solution. Suitable encapsulating materials include: polytetrafluoroethylene (PTFE); epoxies; silicones; polyurethanes, polyimides; silicone-polyimides; Parylenes; polycyclicolefins; silicon-carbons and benzocyclobutenes. Encapsulating materials are commercially available from such companies as Hitachi Chemical (HIR series liquid encapsulants), Dow Chemical (HIPEC® brand encapsulants), and Loctite (Hysol® brand encapsulants).

The central processing circuit 64 is preprogrammed to actuate the lock-out switch circuit 62 (and therefore vary (e.g. reduce) and/or interrupt electrical flow between the leads 52,54,56,58 and, therefore, vary/interrupt electrical communication between the cell 10 and an external load) in response to signals from the current/voltage, temperature, pressure and/or transmitter/receiver circuits 60,66,70,74, respectively. In one embodiment, the central processing circuit 64 is preprogrammed to actuate the lock-out switch circuit 62 in response to receiving one or more of the following signals: (1) a signal from the current/voltage sensing circuit 60 indicating the current and/or voltage into or out of the cell 10 falls outside a predetermined range; (2) a signal from the temperature sensor circuit 66 indicating the temperature detected by one or more temperature sensing elements 68 falls outside a predetermined range; and (3) a signal from the pressure sensor circuit 70 indicating the pressure detected by one or more pressure sensing elements 72 falls outside a predetermined range. The voltage, current, pressure and temperature ranges correspond to acceptable operational values (e.g. charge, discharge and float values which will not render the cell inoperable or result in a catastrophic event) for the electrochemical cell 10. As it is understood by those with ordinary skill in the art, the acceptable operational ranges for a given electrochemical cell are governed by such factors as the components used to construct the cell 10, the architecture of the cell 10, and the application for which the cell 10 is employed.

Figure 3:
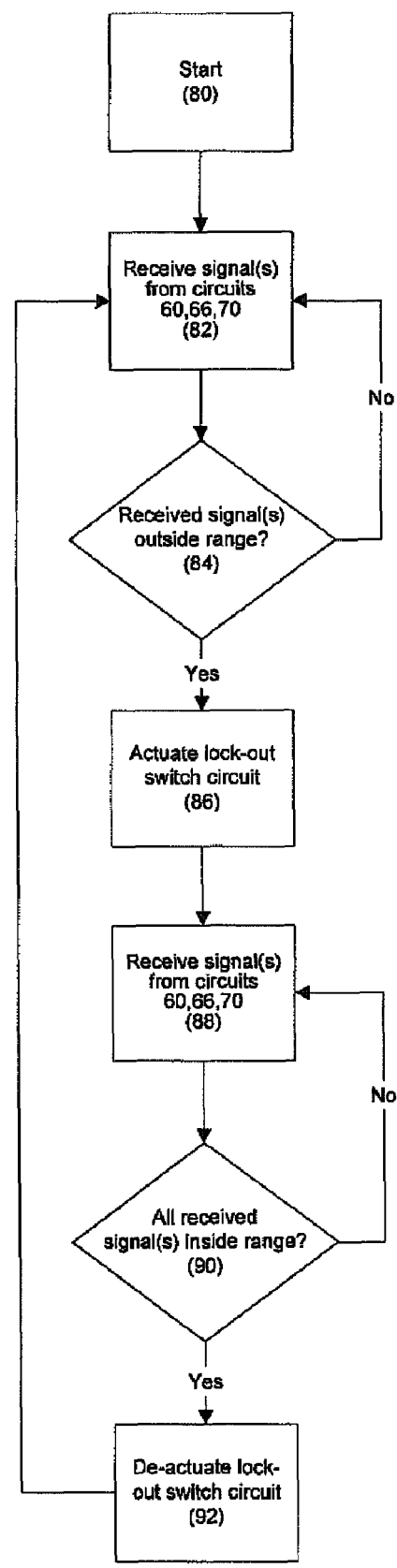
FIG. 3 is a process flow diagram for one method of operation for the cell management device.

FIG. 3 is a process flow-diagram for one method of operation of a cell management device 50. At the start (80) of the operation, the cell management device 50 is in an active mode, the lock-out switch circuit 62 is de-actuated (thereby allowing for full electrical flow between the leads 52,54,56,58), and the cell 10 is in any one of the following modes of operation: recharge, float or discharge. The central processing circuit 64 receives signals from the current/voltage, temperature and/or pressure circuits 60,66,70, respectively (82). The central processing circuit 64 compares the values transmitted by each signal against predetermined ranges stored on the microchip 51 to determine if any of the values fall outside the predetermined ranges (84), thereby indicating the detection of an unacceptable voltage, current, pressure and/or temperature condition. If the values transmitted by circuits 60, 66 and 70 all fall within the acceptable operational ranges, the operation loops back to step 82. If a value transmitted by any one of circuits 60, 66 and 70 falls outside the acceptable operational ranges, the lock-out switch circuit 62 is actuated (86), thereby varying and/or interrupting electrical flow between the input leads 52,54 and output leads 56,58.

The central processing circuit 64 receives subsequent signals from the current/voltage, temperature and/or pressure circuits 60,66,70, respectively (88). The central processing circuit 64 again compares the values transmitted by each signal against predetermined operational ranges stored on the microchip 51 to determine if the values continue to fall outside the predetermined operational ranges (90). If one or more of the values transmitted by circuits 60, 66 and 70 fall outside the acceptable operational ranges, the operation loops back to step 88. If the values transmitted by circuits 60, 66 and 70 all fall inside the acceptable operational ranges, the lock-out switch circuit 62 is de-actuated (92) (thereby allowing for full electrical flow between the input leads 52,54 and output leads 56,58), and the operation loops back to step 82.

Figure 4:
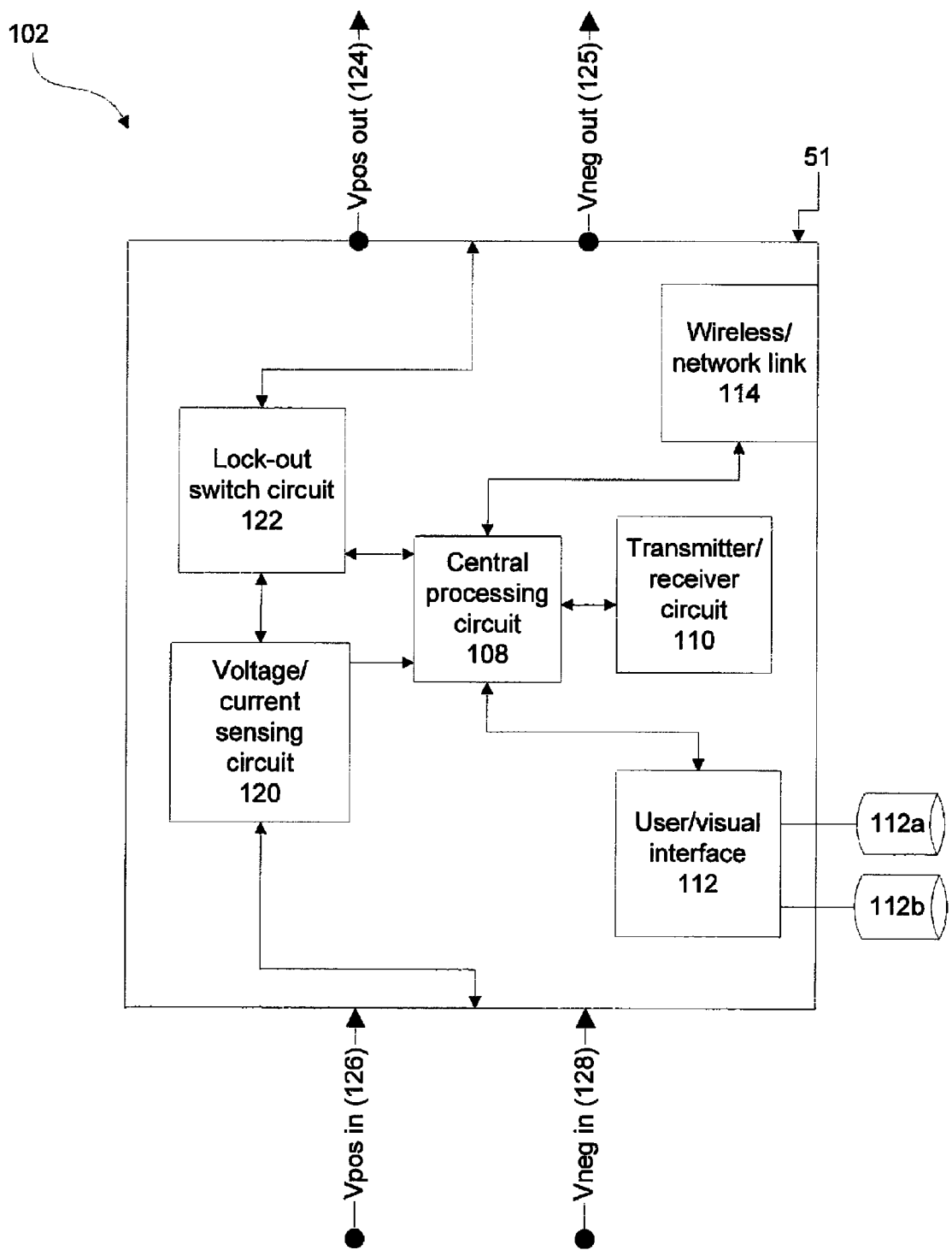
FIG. 4 is a functional diagram of a pack management device.

Referring to FIG. 4, in another embodiment of the present invention two or more electrochemical cells 10 are arranged in parallel and/or series electrical communication with each other in order to form a pack (not illustrated). At least one of the electrochemical cells 10 includes a cell management device 50 as described herein above. A remotely located programmable pack management device 102 in wireless communication with the cell management device(s) 50 receives and records monitoring data (e.g. voltage, current, temperature and pressure) and status data (e.g. operation mode of the lock-out switch circuit 62) transmitted by each cell management device 50, and may be further adapted to transmit control instructions to each cell management device 50. The pack management device 102 may be in communication with one or more packs.

In this embodiment, in order to permit the pack management device 102 the ability to differentiate between cells 10, each cell management device 50 may optionally be associated with a unique identification number (UIN). The UIN allows the cell management device 50 to identify which cell management device 50 transmitted monitoring data received by the pack management device 102, and (optionally) allows the pack management device 102 to transmit a control signal to a specific cell 10. Also, by associating a UIN with each cell management device 50 (and, therefore, cell 10), it is possible to identify the physical location of a cell 10 within the pack which, in turn, provides for the rapid identification and replacement of poor performing or failed or failing cells 10.

In one subembodiment, the programmable pack management device 102 functions only as a tool for identifying cells 10 which meet certain predetermined criteria. The predetermined criteria will depend on the cells 10 employed, as well as the particular application for which the pack is employed. For example, the pack management device 102 could be programmed to identify all cells 10 which have reported actuation of the lock-out switch circuit 62 anytime during the last 100 charge/discharge cycles of the pack. The pack management device 102 could also be programmed to identify all cells 10 having a cell management device 50 which, during a float period, reported a charge voltage exceeding a predetermined value.

The pack management device 102 includes a programmable pack central processing circuit 108 in electrical communication with a pack transmitter/receiver circuit 110 for wirelessly receiving monitoring and status data signals from the cell management device 50 of one or more cells 10. An optional user interface 112 consisting of a display 112a and keypad 112b provides a visual readout of the monitoring and status data transmitted by the cell management device(s) 50, as well as the UIN and/or physical location of the corresponding cell(s) 10. In addition to (or in place of) the optional user interface 112, a wireless or physical link 114 provides for data communication between the pack management device 102 and a processor (not illustrated) such a portable or desktop computer.

It is contemplated that by providing a programmable pack management device 102 in this embodiment, cells 10 can be identified which have not only failed (e.g. the lock-out switch circuit 62 for the cell management device 50 is currently actuated) or potentially failing (e.g. the lock-out switch circuit 62 for the cell management device 50 has been actuated multiple times over a certain number of charge/discharge cycles), but also cells 10 can be identified which are underperforming (e.g. although the cell management device 50 for a given cell 10 reports that the temperature, voltage, current and pressure are within operational ranges, the capacity (amp-hours) has fallen below a predetermined threshold). What constitutes an "underperforming" cell 10 will vary depending upon the application, accordingly because the pack management device 102 is programmable, a user can program define the conditions to be used to determine if a cell 10 is an "underperforming" cell 10. For example, while the operational voltage range (namely, the voltage range within which the cell 10 must operate in order to avoid actuating the lock-out switch circuit 62) preprogrammed into the cell management device 50 is sufficient to ensure continued operation of the cell 10, a particular application may require that the voltage never exceed a smaller range. For example, while the voltage for a cell may be $3V \leqq voltage \leqq 5V$ in order to ensure continued operation of the cell 10, whereas the application dictates that the operational voltage must be between $4V \leqq voltage \leqq 5V$. In this example, the pack management device 102 would identify any cell operating at a voltage of between 3 and 4 V as an "underperforming" cell.

By identifying failed, potentially failing and/or underperforming cells 10, those cells 10 can be replaced and/or isolated, thereby avoiding greatly diminished capacity and/or complete failure of the pack, as well as the opportunity to restore the pack to its full operational capacity.

In one subembodiment, the pack management device 102 is electrically interposed between an external load (not illustrated) and at least one of the pack's positive and negative electrodes (not illustrated). A pack current/voltage sensing circuit 120 is provided for measuring the input and output currents and voltages for one or more packs. A pack lock-out switch circuit 122 electrically interposed between the pack input leads 128,126 and the output leads 124,125 is adapted to vary (e.g. reduce) and/or interrupt electrical flow between the leads 128,126, 124,125 and, therefore, vary/interrupt electrical communication between the pack and an external load. Operation of the pack lock-out switch 122 is controlled by a central processing circuit 108 in electrical communication with both the pack lock-out switch 122 and the pack current/voltage sensing circuit 120.

In response to the status and monitoring data signals transmitted by the cell management devices 50, and based on the pack voltage/current data transmitted by the pack voltage/current sensing circuit, the pack central processing circuit 108, based on predetermined criteria programmed in the pack central processing unit 108, (1) controls the electrical input into/output from one or more cells 10 via the cell lock-out switch circuit 62 and/or (2) controls the electrical input into/output from one or more packs using the pack lock-out switch circuit 122.

Figure 5:
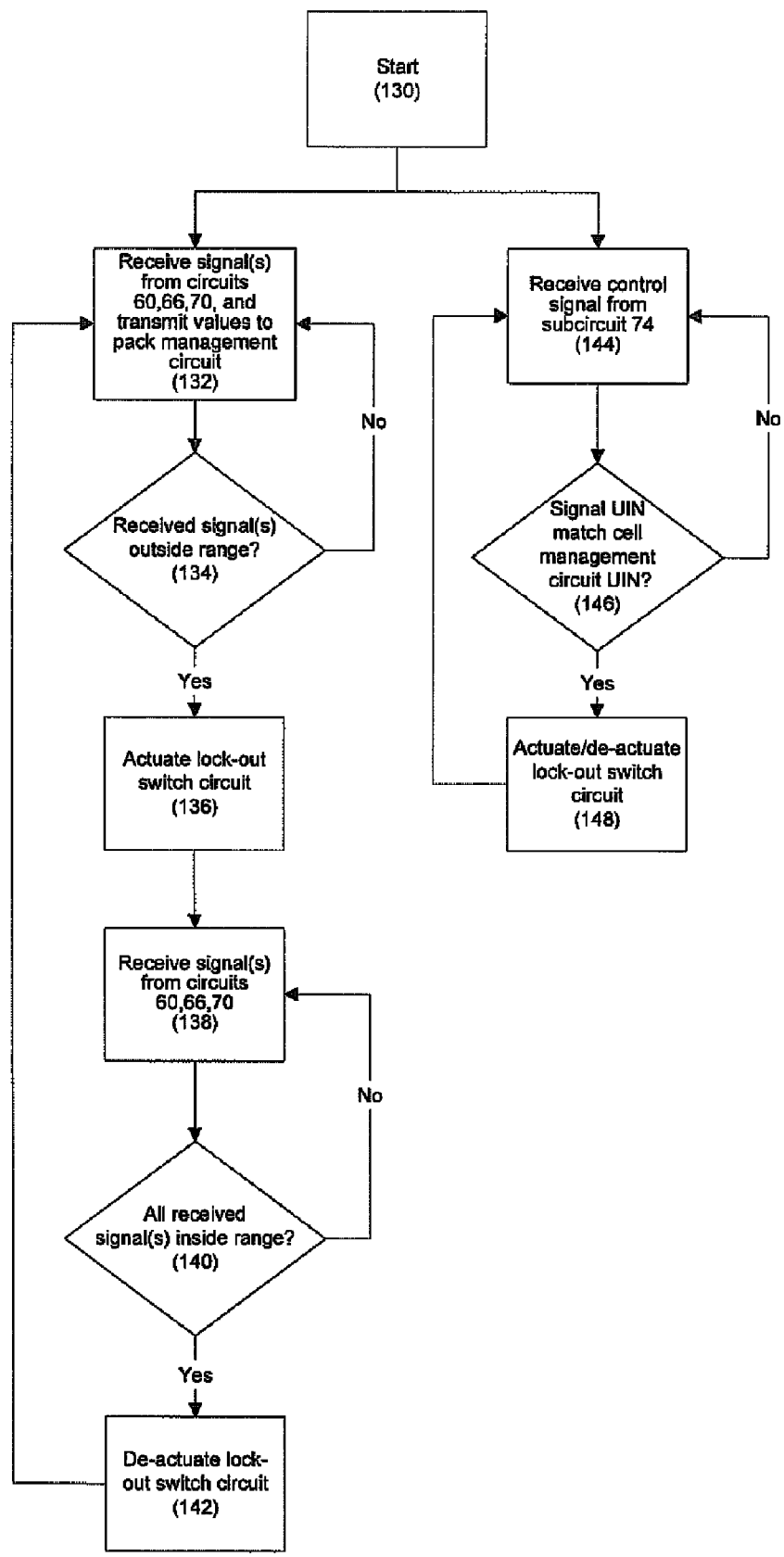
FIG. 5 is a process flow diagram for one method of operation for a cell management device in communication with (and controlled by) a pack management device.

FIG. 5 is a process flow-diagram for one method of operation of a cell management device 50 which is in data communication (and controlled by) a pack management device 102. At the start (130) of the operation, the cell management device 50 is in an active mode, the lock-out switch circuit 62 is de-actuated (thereby allowing for full electrical flow between the leads 52,54,56,58), and the cell 10 is in any one of the following modes of operation: recharge, float or discharge. The central processing circuit 64 receives signals from the current/voltage, temperature and/or pressure circuits 60,66,70, respectively (132). Also, in this step (132) the values transmitted by each signal are also transmitted to the pack management device 102 via the cell transmitter/receiver circuit 74.

The central processing circuit 64 compares the values transmitted by each signal against predetermined ranges stored on the microchip 51 to determine if any of the values fall outside the predetermined ranges (134), thereby indicating the detection of an unacceptable voltage, current, pressure and/or temperature condition. If all the values transmitted by circuits 60, 66 and 70 fall within the acceptable operational ranges, the operation loops back to step 132. If any of the values transmitted by circuits 60, 66 and 70 fall outside the acceptable operational ranges, the lock-out switch circuit 62 is actuated (136), thereby varying and/or interrupting electrical flow between the leads 52,54,56,58.

The central processing circuit 64 receives subsequent signals from the current/voltage, temperature and/or pressure circuits 60,66,70, respectively (138). The central processing circuit 64 again compares the values transmitted by each signal against predetermined operational ranges stored on the microchip 51 to determine it any of the values continue to fall outside the predetermined operational ranges (140). If one or more of the values transmitted by circuits 60, 66 and 70 fall outside the acceptable operational ranges, the operation loops back to step 138. If all the values transmitted by circuits 60, 66 and 70 fall inside the acceptable operational ranges, the lock-out switch circuit 62 is de-actuated (142) (thereby allowing for full electrical flow between the leads 52,54,56,58), and the operation loops back to step 132.

Concurrently with steps 132 through 142, the cell management device 50 also receives signals (144) from the pack management device 102 via the transmitter/receiver circuit 74. The cell central processing circuit 64 filters out (disregards) the signals having an embedded UIN that do not match cell's UIN (146). If the UIN in the signal matches the cell UIN, then the central processing circuit 64 actuates/de-actuates the lock-out switch circuit 62 based on the control instructions transmitted by the pack management device 102 (148), and then loops back to step 142.

In the above described embodiment, a cell management device 50/pack management device 102 combination was described wherein the cell management device 50 was pre-programmed or "hard-wired" to control the operation of the cell 10 based on a set of predetermined criteria. In an alternate embodiment, the cell management device 50 is provided without lock-out switch circuitry 62, and therefore the cell management device 50 functions only as a data reporting tool. The cell management device 50/pack management device 102 of this embodiment is particularly useful for use as a development tool. For example, the combination described in this embodiment may be used to test a cell 10 and/or pack to failure which, in turn, provides information about cell/pack performance ranges and the necessity for design change or improvements.

In yet another alternate embodiment, the cell management device 50 is not preprogrammed or "hard-wired" to control the operation of the cell 10 based on a set of predetermined criteria. Instead, actuation of the cell lock-out switch circuit 62 is completely controlled by the pack management device 102.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A cell management device for monitoring and controlling at least one electrochemical cell, the cell management device comprising:
   a central processing circuit for controlling the operation of the cell management device;
   a current/voltage sensing circuit in electrical communication with the central processing circuit for measuring the input and output currents and voltages for the electrochemical cell; and
   a lock-out switch circuit capable of reducing, increasing, and interrupting electrical flow between the electrochemical cell and an external load, the lock-out switch circuit in electrical communication with and controlled by the central processing circuit;
   whereby when the cell management device is in electrical communication with the electrochemical cell, the cell management device monitors the electrochemical cell and controls electrical input into and output from the electrochemical cell.

2. The cell management device of claim 1, further comprising a temperature sensor circuit in electrical communication with the central processing circuit for collecting internal and external temperature data for the electrochemical cell, and generating a data signal based on the temperature data collected and transmitting the same to the central processing circuit.

3. The cell management device of claim 2, further comprising a temperature sensing element in electrical communication with the temperature sensor circuit, wherein the temperature sensing element is positioned at a location remote from the temperature sensor circuit for measuring temperatures inside and outside the electrochemical cell.

4. The cell management device of claim 2, further comprising a pressure sensor circuit in electrical communication with the central processing circuit for collecting internal pressure data for the electrochemical cell, and generating a signal based on the pressure data and transmitting the same to the central processing circuit.

5. The cell management device of claim 4, further comprising a pressure sensing element in electrical communication with the pressure sensor circuit, wherein the pressure sensing element is positioned at a location remote from the pressure sensor circuit for measuring pressure at multiple locations within the electrochemical cell.

6. An energy storage system, comprising:
   an electrochemical cell; and
   a cell management device in electrical communication with the electrochemical cell for monitoring the electrochemical cell and controlling electrical input into and output from the electrochemical cell based on a predetermined set of conditions, the cell management device comprising:
   a central processing circuit for controlling the operation of the cell management device;
   a current/voltage sensing circuit in electrical communication with the central processing circuit for measuring the input and output currents and voltages for the electrochemical cell; and
   a lock-out switch circuit capable of reducing, increasing, and interrupting electrical flow between the electrochemical cell and an external load, the lock-out switch circuit in electrical communication with and controlled by the central processing circuit.

7. The energy storage system of claim 6, further comprising a temperature sensor circuit in electrical communication with the central processing circuit for collecting internal and external temperature data for the electrochemical cell, and generating a data signal based on the temperature data collected and transmitting the same to the central processing circuit.

8. The energy storage system of claim 7, further comprising a temperature sensing element in electrical communication with the temperature sensor circuit, wherein the temperature sensing element is positioned at a location remote from the temperature sensor circuit for measuring temperatures inside and outside the electrochemical cell.

9. The energy storage system of claim 7, further comprising a pressure sensor circuit in electrical communication with the central processing circuit for collecting internal pressure data for the electrochemical cell, and generating a signal based on the pressure data and transmitting the same to the central processing circuit.

10. The energy storage system of claim 9, further comprising a pressure sensing element in electrical communication with the pressure sensor circuit, wherein the pressure sensing element is positioned at a location remote from the pressure sensor circuit for measuring pressure at multiple locations within the electrochemical cell.

11. The energy storage system of claim 6, wherein the cell management device is positioned within the electrochemical cell.

12. The energy storage system of claim 6, wherein the electrochemical cell comprises an electrode assembly enclosed in a casing, the electrode assembly having a separator interposed between a first electrode and a counter second electrode, and an electrolyte in ion-transfer communication with the first electrode and the second electrode for transferring ionic charge carriers between the first electrode and the second electrode during charge and discharge of the electrochemical cell, the first electrode comprising an electrode active material represented by the general formula:

$$A_a M_b L_c Z_d,$$

wherein:
(a) A is selected from the group consisting of elements from Group I of the Periodic Table, and mixtures thereof, and $0 \leq a \leq 9$;
(b) M includes at least one redox active element, and $0 < b \leq 4$;
(c) L is selected from the group consisting of X'[O4-x,Y'x], X'[O4-y,Y'2y], X"S4, [Xz'",X'1-z]O4, and mixtures thereof, wherein:
　i. X' and X''' are each independently selected from the group consisting of P, As, Sb, Si, Ge, V, S, and mixtures thereof;
　ii. X" is selected from the group consisting of P, As, Sb, Si, Ge, V, and mixtures thereof; and
　iii. Y' is selected from the group consisting of halogens selected from Group 17 of the Periodic Table, S, N, and mixtures thereof;
　iv. $0 \leq x \leq 3$, $0 \leq y \leq 2$, $0 \leq z \leq 1$ and $0 < z \leq 3$; and
(d) Z is selected from the group consisting of a hydroxyl (OH), a halogen selected from Group 17 of the Periodic Table, and mixtures thereof, and $0 \leq e \leq 4$;
wherein A, M, L, Z, a, b, c and d are selected so as to maintain electroneutrality of the positive electrode active material in its nascent state.

13. A cell management system, comprising:
a pack management device in wireless communication with a cell management device for wirelessly receiving and monitoring data transmitted by the cell management device, the programmable pack management device being further adapted to transmit control instructions to the cell management device, the pack management device comprising a pack central processing circuit in electrical communication with a pack transmitter/receiver circuit for wirelessly receiving monitoring data transmitted from the cell management device;
the cell management device comprising:
　a central processing circuit for controlling the operation of the cell management device;
　a current/voltage sensing circuit in electrical communication with the central processing circuit for measuring the input and output currents and voltages for the electrochemical cell;
　a lock-out switch circuit capable of reducing, increasing, and interrupting electrical flow between the electrochemical cell and an external load, the lock-out switch circuit in electrical communication with and controlled by the central processing circuit; and
　a transmitter/receiver circuit in electrical communication with the central processing circuit for wirelessly transmitting to and receiving signals from the programmable pack management device.

14. The cell management system of claim 13, wherein the pack management device is programmable, and transmits control instructions to the cell management device based on predetermined criteria programmed in the pack management device.

15. The cell management system of claim 13, wherein the cell management device further comprises a temperature sensor circuit in electrical communication with the central processing circuit for collecting internal and external temperature data for the electrochemical cell, and generating a data signal based on the temperature data collected and transmitting the same to the central processing circuit.

16. The cell management system of claim 15, wherein the cell management device further comprises a pressure sensor circuit in electrical communication with the central processing circuit for collecting internal pressure data for the electrochemical cell, and generating a signal based on the pressure data and transmitting the same to the central processing circuit.

17. A method of operating a cell management device in electrical communication with an electrochemical cell, the cell management device comprising:
　a central processing circuit for controlling the operation of the cell management device;
　a current/voltage sensing circuit in electrical communication with the central processing circuit for measuring the input and output currents and voltages for the electrochemical cell;
　a lock-out switch circuit in electrical communication with and controlled by the central processing circuit capable of reducing, increasing, and interrupting electrical flow between the electrochemical cell and an external load;
　a temperature sensor circuit in electrical communication with the central processing circuit for collecting internal and external temperature data for the electrochemical cell, generating a data signal based on the temperature data collected, and transmitting the same to the central processing circuit; and
　a pressure sensor circuit in electrical communication with the central processing circuit for collecting internal pressure data for the electrochemical cell, generating a signal based on the pressure data, and transmitting the same to the central processing circuit, the method comprising the steps of:
　transmitting to the central processing circuit a signal from a circuit selected from the group consisting of the current/voltage sensing circuit, the temperature sensing circuit, and the pressure sensing circuit;
　comparing values transmitted by the signal against predetermined ranges to determine if any of the values fall outside the predetermined ranges;
　actuating the lock-out switch to reduce or increase the electrical flow between the electrochemical cell and the external load if any of the values fall outside the predetermined ranges;
　transmitting subsequent signals from a circuit selected from the group consisting of the current/voltage sensing circuit, temperature sensing circuit, pressure sensing circuit, and a combination thereof, to the central processing circuit;
　comparing values transmitted by each subsequent signal against predetermined ranges to determine if any of the values fall outside the predetermined ranges; and
　de-actuating the lock-out switch if all of the values fall inside the predetermined ranges.

18. The method of operating a cell management device of claim 17, wherein the cell management device further includes a transmitter/receiver circuit in electrical communication with the central processing circuit for wirelessly transmitting to and receiving signals from a programmable pack management device capable of receiving signals from and transmitting signals to one or more cell management devices; and
　wherein the step of transmitting signals from a circuit selected from the group consisting of the current/voltage sensing circuit, temperature sensing circuit, pressure sensing circuit, and a combination thereof, to the central processing circuit, further comprises the steps of:

wirelessly transmitting the values transmitted by each signal to the pack management device via the cell transmitter/receiver circuit;

comparing values transmitted by each signal received by the pack management device against predetermined ranges to determine if any of the values fall outside the predetermined ranges;

transmitting control instructions from the pack management device to the cell management device;

receiving the control instructions by the cell management device and actuating the lock-out switch to vary or interrupt the electrical flow between the electrochemical cell and the external load;

transmitting subsequent signals from a circuit selected from the group consisting of the current/voltage sensing circuit, temperature sensing circuit, pressure sensing circuit, and a combination thereof, to the central processing circuit;

wirelessly transmitting the values transmitted by each subsequent signal to the pack management device via the cell transmitter/receiver circuit;

comparing values transmitted by each subsequent signal received by the pack management device against predetermined ranges to determine if any of the values fall outside the predetermined ranges;

transmitting subsequent control instructions from the pack management device to the cell management device; and receiving the subsequent control instructions by the cell management device and de-actuating the lock-out switch to permit electrical flow between the electrochemical cell and the external load.

* * * * *

UNITED STATES PATENT AND TRADEMARK OFFICE
CERTIFICATE OF CORRECTION

| | |
|---|---|
| PATENT NO. | : 7,960,047 B2 |
| APPLICATION NO. | : 11/873924 |
| DATED | : June 14, 2011 |
| INVENTOR(S) | : Carl Berg |

It is certified that error appears in the above-identified patent and that said Letters Patent is hereby corrected as shown below:

Column 6 Line 34

Delete "$0 \leq a \leq 4$" Insert --$0 < a \leq 4$--

Column 10

Line 9: Delete "$0 \leq x \leq \leq 3$" Insert --$0 \leq x \leq 3$--

Line 33: Delete "$0 \leq d \leq 1$" Insert --$0 < d < 1$--

Column 11

Line 8: Delete "$0 \leq q \leq 1$" Insert --$0 < q < 1$--

Line 35: Delete "$0 \leq y \leq 2$" Insert --$0 < y \leq 1$--

Line 40: Delete "w+aa+bb) $\geq$ 1.2" Insert --w+aa+bb) $\leq$ 1.2--

Column 13

Line 33: Delete "$Li_{2.025}Cu_{0.8}$" Insert --$Li_{2.025}Co_{0.8}$--

Signed and Sealed this
Seventh Day of February, 2012

David J. Kappos
*Director of the United States Patent and Trademark Office*